(12) United States Patent
Sugihara et al.

(10) Patent No.: US 9,570,735 B2
(45) Date of Patent: Feb. 14, 2017

(54) DEGASSING METHOD FOR ELECTRODE PASTE

(71) Applicant: TOYOTA JIDOSHA KABUSHIKI KAISHA, Toyota-shi, Aichi-ken (JP)

(72) Inventors: Atsushi Sugihara, Toyota (JP); Masao Nakashima, Toyota (JP); Yuji Shimozono, Toyota (JP); Hidefumi Gotoh, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/041,678

(22) Filed: Feb. 11, 2016

(65) Prior Publication Data

US 2016/0248076 A1 Aug. 25, 2016

(30) Foreign Application Priority Data

Feb. 19, 2015 (JP) ................. 2015-030311

(51) Int. Cl.
*B01D 19/00* (2006.01)
*H01M 4/04* (2006.01)
*H01M 4/139* (2010.01)
*H01M 4/88* (2006.01)

(52) U.S. Cl.
CPC .......... *H01M 4/043* (2013.01); *B01D 19/0031* (2013.01); *B01D 19/0036* (2013.01); *B01D 19/0042* (2013.01); *B01D 19/0057* (2013.01); *H01M 4/04* (2013.01); *H01M 4/139* (2013.01); *H01M 4/88* (2013.01); *H01M 4/0404* (2013.01)

(58) Field of Classification Search
None
See application file for complete search history.

(56) References Cited

U.S. PATENT DOCUMENTS

| 2009/0117461 | A1 | 5/2009 | Shembel et al. |
| 2013/0280413 | A1 | 10/2013 | Uchida |
| 2013/0323586 | A1* | 12/2013 | Uezono ............... H01M 4/0404 429/211 |
| 2014/0010037 | A1 | 1/2014 | Kitayoshi et al. |

FOREIGN PATENT DOCUMENTS

| EP | 1 231 652 A1 | 8/2002 |
| JP | 2004-171918 A | 6/2004 |
| JP | 2006-310120 A | 11/2006 |
| JP | 2012-003992 A | 1/2012 |
| JP | 2014-017064 A | 1/2014 |
| KR | 10-2013-0108460 A | 3/2013 |
| WO | 2007126400 A1 | 11/2007 |

* cited by examiner

*Primary Examiner* — Duane Smith
*Assistant Examiner* — Phillip Shao
(74) *Attorney, Agent, or Firm* — Sughrue Mion, PLLC

(57) ABSTRACT

Provided is a degassing method for an electrode paste that introduces the electrode paste formed by kneading a solid content containing an electrode active material and a dispersion medium into a decompressed container and degassing the electrode paste while a shear force is applied to the electrode paste. A ratio of the solid content in the electrode paste is set to be 55 mass % or more, and a pressure in the decompressed container is set to be −50 kPa or more. It is possible to suppress both remaining bubbles and dry of the electrode paste, thus enhancing a product yield.

6 Claims, 5 Drawing Sheets

DEGASSING METHOD FOR ELECTRODE PASTE

INCORPORATION BY REFERENCE

The disclosure of Japanese Patent Application No. 2015-030311 filed on Feb. 19, 2015 including the specification, drawings and abstract is incorporated herein by reference in its entirety

BACKGROUND OF THE INVENTION

1. Field of the Invention

The present invention relates to a degassing method for an electrode paste.

2. Description of Related Art

Lithium ion secondary batteries are nonaqueous electrolyte secondary batteries that are chargeable-rechargeable by lithium ions in a nonaqueous electrolyte moving between positive electrodes and negative electrodes that store and discharge lithium ions. Large-capacity lithium ion secondary batteries have recently been installed in electric vehicles (EV) and plug-in hybrid vehicles (PHV).

Each of the negative electrodes and the positive electrodes of the above lithium ion secondary batteries has a layered structure in which an active material layer is formed on a current collector. The active material layer is formed by applying and drying a positive electrode paste or a negative electrode paste (referred to as an "electrode paste", hereinafter) containing a solid content, such as an active material, a bonder, and a thickener, and a dispersion medium (solvent) onto the current collector, and thereafter, is press-processed.

Generally, the above electrode paste is produced by mixing the solid content, such as an active material, a bonder, and a thickener, and subsequently, kneading an obtained powder mixture and a dispersion medium. At this time, bubbles are usually contained in the kneaded electrode past; therefore, if this pates is applied onto the current collector as it is, no active material and others is applied to portions of the current collector in contact with the bubbles, which causes so-called "transparency defects". Hence, a degassing process to eliminate bubbles in the electrode paste is carried out after the kneading process and before the application process.

Meanwhile, in the electrode paste, in order to reduce time required in a drying process for the sake of enhancement of productivity, a higher solid content ratio has been promoted by decreasing a mixture ratio of a dispersion medium. As the solid content ratio of the electrode paste becomes more increased, viscosity thereof becomes more increased, so that it becomes more difficult to release bubbles. In particular, the solid content ratio of the electrode paste of 50 mass % or more makes it difficult to perform degassing.

Japanese Patent Application Publication No. 2014-017064 discloses a technique in which while an electrode paste after being kneaded is introduced into a degassing tank to be formed into a film form, bubbles in the electrode paste is removed by decompressing the degassing tank. By setting a degree of vacuum to be approximately −90 kPa, degassing of the electrode paste having a solid content ratio as high as approximately 50 mass % becomes feasible. In the present specification, the degree of vacuum (degree of decompression) is represented in terms of gauge pressure.

The present inventors have found the following problems in the degassing method for an electrode paste described in JP 2014-017064 A. In the case of further increasing the solid content ratio of the electrode paste to be 55 mass % or more, if the degassing processing at a degree of vacuum of approximately −90 kPa is carried out, bubbles that are generated in the electrode paste by decompressing still remain, which might cause a large amount of transparency defects in the application process. Further increase in degree of vacuum reduces bubbles, but the electrode paste becomes likely to be dried in the degassing process because of the higher solid content ratio; consequently, striation defects are likely to occur during the application process.

SUMMARY OF THE INVENTION

The present invention provides a degassing method for an electrode paste capable of effectively degassing the electrode paste having a solid content ratio of 55 mass % or more.

A degassing method for an electrode paste according to the present invention includes introducing an electrode paste formed by kneading a solid content that contains an electrode active material and a dispersion medium into a decompressed container and degassing the electrode paste while a shear force is applied to the electrode paste, wherein a ratio of the solid content in the electrode paste is set to be 55 mass % or more, and a pressure in the decompressed container is set to be −50 kPa or more. By setting the pressure in the decompressed container is set to be −50 kPa or more, it is possible to suppress both remaining bubbles and dry of the electrode paste, thereby enhancing a product yield.

The electrode paste may be formed into a film form while the shear force is applied to the electrode paste. Through this configuration, it is possible to encourage the degassing. The pressure in the decompressed container may be set to be −20 kPa or less. Through this configuration, it is possible to encourage the degassing.

The electrode paste may be fed to a disk-shaped rotor disposed in the decompressed container so as to apply the shear force to the electrode paste. With a simple configuration, it is possible to apply the shear force to the electrode paste. The electrode paste may be brought to spatter from the rotor so as to collide against an inner wall surface of the decompressed container. It is possible to encourage the degassing by breakage of the bubbles at the time of the collision. The electrode paste discharged from the decompressed container may be filtered through a filter. Through this configuration, it is possible to eliminate remaining bubbles.

According to the present invention, it is possible to provide the degassing method for an electrode paste capable of effectively degassing the electrode paste having a solid content ratio of 55 mass % or more.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

First Embodiment

Hereinafter, a specific embodiment to which the present invention is applied will be described in detail with reference to drawings. However, the present invention is not limited to the following embodiment. For clarification of explanation, the following description and drawings are appropriately simplified.

Nonaqueous Electrolyte Secondary Battery

Figure 1:
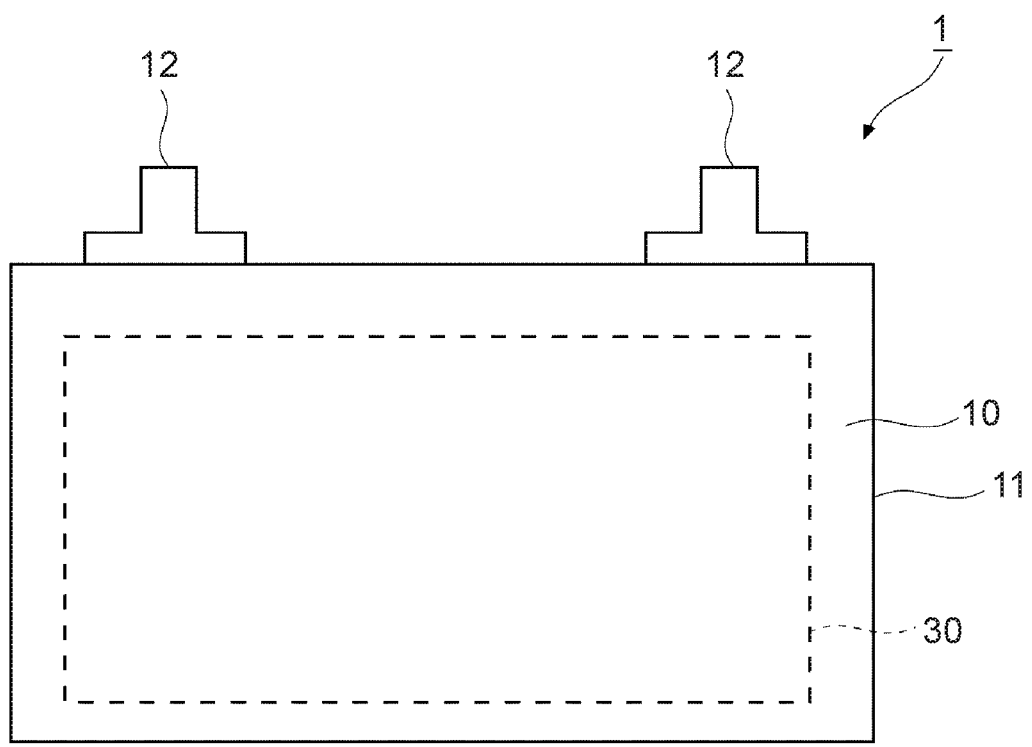
FIG. 1 is a schematic overall view of a configuration example of a nonaqueous electrolyte secondary battery.
Figure 2:
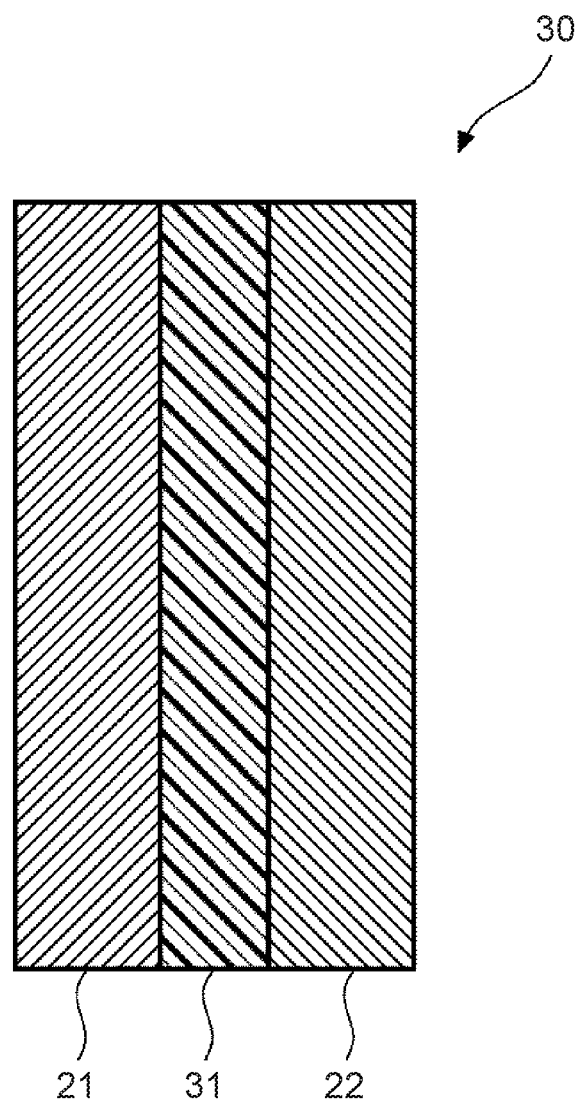
FIG. 2 is a schematic sectional view of an electrode layered body.
Figure 3:
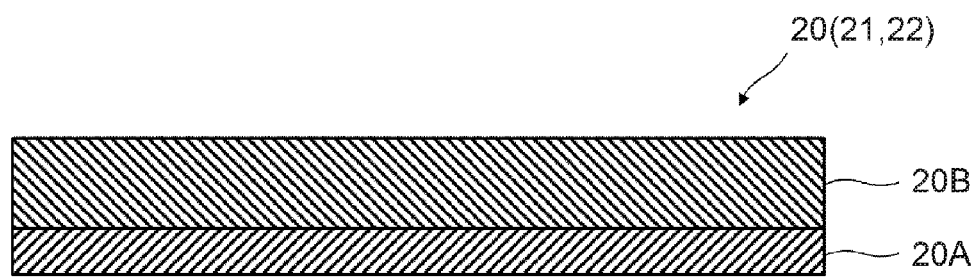
FIG. 3 is a schematic sectional view of an electrode.

With reference to drawings FIG. 1 to FIG. 3, there will be described a nonaqueous electrolyte secondary battery produced by using an electrode paste subjected to degassing with a degassing method for an electrode paste according to the first embodiment of the present invention. In the present embodiment, a lithium ion secondary battery will be explained as an example of the nonaqueous electrolyte secondary battery. FIG. 1 is a schematic overall view of a configuration example of the nonaqueous electrolyte secondary battery. FIG. 2 is a schematic sectional view of an electrode layered body. FIG. 3 is a schematic sectional view of an electrode.

The nonaqueous electrolyte secondary battery 1 as shown in FIG. 1 is configured by housing an electrode layered body 30 and a nonaqueous electrolyte (not shown) in an outer jacket (battery container) 11. As shown in FIG. 2, the electrode layered body 30 is formed by stacking a positive electrode 21 and a negative electrode 22 with a separator 31 disposed therebetween so as to isolate them from each other. An outer surface of the outer jacket 11 is provided with two external terminals (a positive terminal and a negative terminal) 12 for external connection.

As the nonaqueous electrolyte, a well-known nonaqueous electrolyte may be used, and a liquid, gel, or solid nonaqueous electrolyte may be used. For example, it is preferable to use a nonaqueous electrolyte solution formed by solving a lithium-content electrolyte in a mixed solvent of a high-dielectric-constant carbonate solvent, such as propylene carbonate and ethylene carbonate, and a low-viscosity carbonate solvent, such as diethyl carbonate, methylethyl carbonate, and dimethyl carbonate.

As the mixed solvent, for example, it is preferable to use a mixed solvent, such as ethylene carbonate (EC)/dimethyl carbonate (DMC)/ethyl methyl carbonate (EMC), and ethylene carbonate (EC)/diethyl carbonate (DEC). An example of the lithium-content electrolyte may include a lithium salt, such as $LiPF_6$, $LiBF_4$, $LiClO_4$, $LiAsF_6$, $Li_2SiF_6$, $LiOSO_2C_kF_{(2k+1)}$ (k=an integer from 1 to 8), and $LiPF_n\{C_kF_{(2k+1)}\}_{(6-n)}$ (n=an integer from 1 to 5, k=an integer from 1 to 8), and a combination thereof, for example.

As the separator 31, any film may be used as far as the film electrically isolates the positive electrode 21 from the negative electrode 22, and is transmissive to lithium ions, and it is preferable to use a porous polymer film. For example, it is preferable to use a polyolefin porous film, such as a PP (polypropylene) porous film, a PE (polyethylene) porous film, and a PP (polypropylene)-PE (polyethylene) layered porous film.

As shown in FIG. 3, an electrode 20 (the positive electrode 21 or the negative electrode 22) is formed by disposing an electrode active material layer 20B on a current collector 20A. The electrode active material layer 20B is formed on one surface or both surfaces of the current collector 20A. FIG. 3 shows an example of the electrode active material layer 20B disposed on one surface of the current collector 20A.

A positive electrode active material layer is formed, for example, by applying a positive electrode paste containing an positive electrode active material, an electrode conductive assistant such as carbon powders, a bonder such as polyvinylidene fluoride (PVDF), and a dispersion medium such as N-methyl-2-pyrrolidone (NMP) on an aluminum foil, and then drying and press-processing this paste. An example of the positive electrode material may include a lithium-content complex oxide, such as $LiCoO_2$, $LiMnO_2$, $LiMn_2O_4$, $LiNiO_2$, $LiNi_xCo_{(1-x)}O_2$, and $LiNi_xCo_yMn_{(1-x-y)}O_2$, for example (in Formula, $0<x<1$, $0<y<1$).

The negative electrode active material is formed, for example, by applying a negative electrode paste containing a negative electrode active material, a bonder such as modified styrene-butadiene copolymer latex (SBR), a thickener such as carboxymethyl-cellulose sodium salt (CMC), and a dispersion medium such as water onto a current collector such as a copper foil, and then drying and press-processing this paste. As the negative electrode active material, it is preferable to use a negative electrode active material having a lithium storage capacity of 2.0 V or less on the basis of Li/Li+. An example of the negative electrode active material may include carbon such as graphite, a metallic lithium, a lithium alloy, and a transition metal oxide/transition metal nitride/transition metal sulfide capable of doping and dedoping lithium ions, and combination thereof, or the like.

Degassing Method for Electrode Paste

Figure 4:
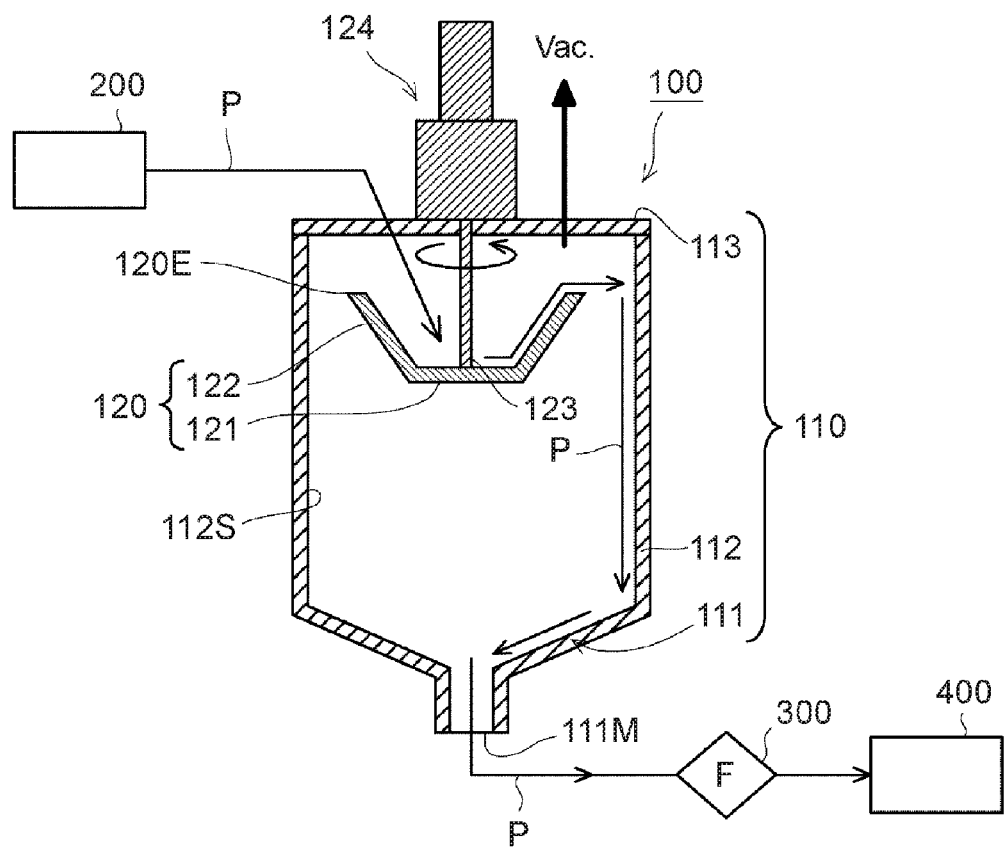
FIG. 4 is a drawing for explaining a degassing method for an electrode paste according to a first embodiment of the present invention, and schematically showing a degassing apparatus 100 as well as preceding equipment and subsequent equipment thereof.

With reference to FIG. 4, the degassing method for the electrode paste according to the first embodiment of the present invention will be described. FIG. 4 is a drawing for explaining the degassing method for the electrode paste according to the first embodiment of the present invention, and is a drawing schematically showing a degassing apparatus 100 and respective preceding equipment and subsequent equipment thereof. The degassing apparatus 100 of FIG. 4 is shown in a schematic longitudinal sectional view. There will be described the degassing method for the electrode paste together with the degassing apparatus 100.

The degassing method for the electrode paste according to the present embodiment is preferable for a high-solid-content-ratio electrode paste of which ratio of a solid content (solid content ratio) such as the active material, the bonder, and the thickener excluding the dispersion medium is 55 mass % or more. The above degassing method for the electrode paste is applicable to either of the electrode paste for the positive electrode and an electrode paste for the negative electrode.

As shown in FIG. 4, the degassing apparatus 100 of the present embodiment includes a container 110 and a rotor 120 disposed inside the container 110. The container 110 is a decompressed tank (decompressed container) that can be sealed, and an inside thereof is decompressed by a vacuum device Vac. including a vacuum pump. The container 110 includes a tank body that includes a lower part 111 in a funnel shape and a cylindrical side part 112, and a cover member 113 that closes an upper opening of the tank body. The cover member 113 is provided with a paste feeding part (not shown) such as a feeding nozzle, and an electrode paste P is fed from this part into the container 110. The lower part 111 is provided with a discharge port 111M of the electrode paste P.

The rotor 120 includes at least a horizontal part 121. In the present embodiment, the rotor 120 is a dish-shaped rotor including the horizontal part 121 and a side part 122 extending outward in the obliquely upwardly direction from this horizontal part 121, and an upper portion thereof is formed to be an opening. The shape of the rotor 120 is not limited to a specific shape as far as the rotor 120 includes at least the horizontal part 121, and may be a simple disk formed by only the horizontal part 121.

A motor 124 is provided on the cover member 113 of the container 110, and this motor 124 and a center of the horizontal part 121 of the rotor 120 is connected to each other through a motor shaft 123. The rotor 120 is rotated around the motor shaft 123 by driving of the motor 124. The rotor 120 is disposed at an upper position (position closer to the cover member 113) than a central height of the side part 112.

In FIG. 4, preceding equipment 200 disposed in a preceding step of the degassing apparatus 100 is a kneader or a storage device of the electrode paste P, or the like, for example. The electrode paste P is fed from the preceding equipment 200 to the degassing apparatus 100 via piping and others.

The electrode paste P fed from the preceding equipment 200 of the electrode paste P is fed through the cover member 113 into the rotor 120 disposed inside the container 110. FIG. 4 schematically illustrates a feeding path of the electrode paste P from the preceding equipment 200 to the degassing apparatus 100, and then into the rotor 120 by using arrows.

The electrode paste P is fed to the vicinity of a central portion of the horizontal part 121 of the rotor 120, for example. The electrode paste P fed on the horizontal part 121 is subjected to a shearing force by rotation of the rotor 120 so as to be formed into a film form with a low viscosity. Furthermore, the electrode paste P rises up along the side part 122 due to a centrifugal action, and spatters from an outermost circumferential edge 120E of the rotor 120. The spattering electrode paste P collides against an inner wall surface 112S of the side part 112 of the container 110, and flows down along the inner wall surface 112S toward the discharge port 111M. FIG. 4 schematically shows a path after the electrode paste P is fed into the degassing apparatus 100 by using arrows.

The electrode paste P discharged from the discharge port 111M of the degassing apparatus 100 is preferably fed through a filter 300 to an application apparatus 400. The electrode paste P after the degassing process might contain a small amount of bubbles or various foreign contaminants in some cases. The electrode paste P after the degassing process is subjected to pressure-filtrating by using the filter 300, thereby removing a small amount of remaining bubbles or various foreign contaminants. As the filter 300, a well-known filter may be used. The application apparatus 400 is a coating die or the like that applies the electrode paste P onto the current collector.

As aforementioned, in the degassing method of the electrode paste according to the present embodiment, the electrode paste P is fed onto the horizontal part 121 of the rotor 120, and a shearing force is applied to the electrode paste P by the rotational action of the rotor 120 so as to form the electrode paste P into a film form with a low viscosity. Along with decompression in the container 110, the electrode paste P is formed into a film form with a lower viscosity with a simple configuration, thereby encouraging degassing of the electrode paste P. The electrode paste P is further brought to spatter against the inner wall surface 112S of the container 110. The collision action against the inner wall surface 112S breaks (eliminates) bubbles expanded in the electrode paste P due to decompression. By the aforementioned principle, it is possible to effectively degas even the electrode paste P having a high solid content ratio and a high viscosity.

In the degassing method for the electrode paste according to the present embodiment, it is supposed that the solid content ratio of the electrode paste P is 55 mass % or more. The electrode paste P may be either of a positive electrode paste and a negative electrode paste. Since the solid content ratio of the electrode paste P is 55 mass % or more, it is possible to reduce drying time after the application process. The solid content ratio of the electrode paste P is preferably 65 mass % or less. If the solid content ratio becomes more than 65 mass %, striation defects are likely to be caused in the application process due to increase in viscosity.

One of features of the degassing method for the electrode paste according to the present embodiment is that the inner pressure of the container 110 is decompressed to be −50 kPa or more. In the degassing method of the related art that degases the electrode paste P having a solid content ratio of approximately 50 mass %, it is necessary to decompress the inner pressure of the container 110 to be approximately −90 kPa. It has been considered that degassing is further encouraged as the inner pressure of the container 110 is lower, that is, as the degree of vacuum is higher, and this is preferable.

The present inventors have found that in the case of setting the solid content ratio of the electrode paste to be 55 mass % or more, if the degassing processing is carried out at the degree of vacuum of approximately −90 kPa, bubbles generated in the electrode paste due to decompression are not completely eliminated, and still remain in the electrode paste, which might cause a large amount of transparency defects in the application process. In addition, it has also been found that a further higher degree of vacuum reduces bubbles, but the electrode paste becomes likely to be dried in the degassing process, which might cause striation defects in the application process.

The present inventor have found that, contrary to the general knowledge common among the related arts, the inner pressure of the container 110 is set to be −50 kPa or more, which is higher than that of the related arts so as to suppress both bubbles and dry of the electrode paste, thereby reducing a percentage of defects (enhancing an efficiency percentage, i.e., a product yield). If the inner pressure of the container 110 is set to be lower than −50 kPa, gas (such as dissolved oxygen) derived from the solvent remaining in the paste appears as bubbles, and such bubbles are not completely eliminated and still remain; therefore, the number of bubbles becomes abruptly increased after the degassing process.

In the degassing method for the electrode paste according to the present embodiment, the degree of vacuum may be lower (the pressure may be higher) than that of the related arts, and thus a vacuum pump can be configured to be compact, which is preferable for facility cost and running cost. Furthermore, since the degree of vacuum is reachable even if there is small leakage in the container 110, it is possible to suppress stoppage of the production line before a desired degree of vacuum is reached; therefore, it is excellent in productivity. The inner pressure of the container 110 may be any value as far as it is smaller than the atmospheric pressure, but more preferably, the inner pressure of the container 110 is set to be −20 kPa or less in order to encourage the degassing through breakage of bubbles in the electrode paste P. It is further more preferable to set the inner pressure of the container 110 to be −40 kPa or less so as to suppress transparency defects in the application process.

It is preferable to set a shear rate of the outermost circumferential edge 120E of the rotor 120 to be within a range of $1 \times 10^5$ to $1 \times 10^7$ s$^{-1}$. This shear rate is applied to the electrode paste P located at the outermost circumferential edge 120E of the rotor 120. The viscosity of the electrode paste P varies depending on the shear rate, and the viscosity becomes lower as the shear rate is greater, so that the degassing becomes easier. Specifically, at the shear rate of less than $1 \times 10^5$ s$^{-1}$, the viscosity is not sufficiently lower, so that the degassing becomes insufficient, and breakage of bubbles by collision against the inner wall surface 112S also becomes insufficient. On the other hand, the shear rate of more than $1 \times 10^7$ s$^{-1}$ generates bubbles when the electrode paste P collides against the inner wall surface 112S, which rather increases transparency defects in the application process. The "shear rate of the outermost circumferential edge of the rotor in any form" can be obtained by a well-known method based on a maximum diameter of the outermost circumferential edge of the rotor, a plan-view shape of the outermost circumferential edge of the rotor, and the number of rotation of the rotor.

A distance between the rotor 120 and the inner wall surface 112S of the container 110 may be designed within a range in which the electrode paste P fed into the rotor 120 stably collies against the inner wall surface 112S of the container 110. For this purpose, preferably, the distance between the rotor 120 and the inner wall surface 112S of the container 110 is set to be 200 mm or less.

As aforementioned, according to the present embodiment, it is possible to provide the degassing method for the electrode paste P capable of effectively degassing the electrode paste P having a high solid content ratio.

Experimental Example

Hereinafter, there will be explained an experimental example in which the number of bubbles and an efficiency percentage were investigated by using various degrees of vacuum so as to verify the effect of the degassing method for the electrode paste according to the first embodiment. In the experimental example, a negative electrode paste was used. Graphite was used as a negative electrode active material, carboxymethyl-cellulose sodium salt (CMC) was used as a thickener, modified styrene-butadiene copolymer latex (SBR) was used as a bonding solvent, and water was used as a dispersion solvent.

The material blending ratio of the solid content was graphite/CMC/SBR=98.6/0.7/0.7 (mass ratio of the solid content). The solid content ratio of the paste was set to be 60 mass %. The temperature of the paste was set to be 20° C. The viscosity of the paste at a shear rate of 2.0 s$^{-1}$ was 14812.5 mPa·s.

Degassing of the aforementioned negative electrode paste was carried out by using the degassing apparatus 100 having the structure as shown in FIG. 4. A vacuum tank was used as the container 110. The inner diameter of the vacuum tank was 300 mmφ. The feed rate of the electrode paste relative to the horizontal part 121 of the rotor 120 and the discharging rate of the electrode paste from the discharge port 111M were both 1.4 L/min.

As the rotor 120, a dish-shaped rotor including the horizontal part 121, the side part 122 extending outward in the obliquely upwardly direction from this horizontal part 121, and an opening upper portion was used. With respect to the dimension of the rotor 120, a lower diameter was 150 mmφ, and a height was 45 mm. Each thickness of the horizontal part 121 and the side part 122 was set to be 2 mm. An angle of inclination of the side part 122 relative to the horizontal part 121 was set to be 60°.

A distance between the rotor 120 and the inner wall surface 112S of the container 110 was 200 mm or less. The rotational rate of the rotor 120 was set to be 1500 rpm. Hence, the shear rate of the outermost circumferential edge 120E of the rotor 120 was $2.8 \times 10^6$ s$^{-1}$. Under the above various conditions, the degassing was carried out by using various degrees of vacuum of the container 110: 0, −20, −40, −50, −60, −80, and −95 kPa under the respective conditions.

Measurement Method of the Number of Bubbles

The paste after the degassing was discharged from the discharge port 111M, each paste of 10 cc was held between a pair of glasses opposing each other with a distance therebetween, and a photograph of each past was taken by using an optical camera. Each obtained photograph was subjected to a well-known image analysis so as to obtain the number of bubbles per 10 cc of each paste. With respect to the number of bubbles, the total number of bubbles and the number of bubbles having a diameter of 0.3 mm or more were found.

Quality Product Determination

Each paste after the degassing was compressively filtered by using a depth filter (resin filter with an average opening diameter of 50 μm). Subsequently, each filtered paste was applied onto a copper foil in a web form that was a current collector by using a die coater, and was brought to pass through a drying furnace to be dried. Striation defects were visually checked by determining whether or not application was feasible by the die coater, and products with no striations were determined as quality products. Transparency defects were determined by investigating the number of defects per unit length of each copper foil by using a flaw inspection system manufactured by Futec Inc. Products of which number of defects per 1 m was not more than a predetermined reference value were determined as quality products.

Figure 5:
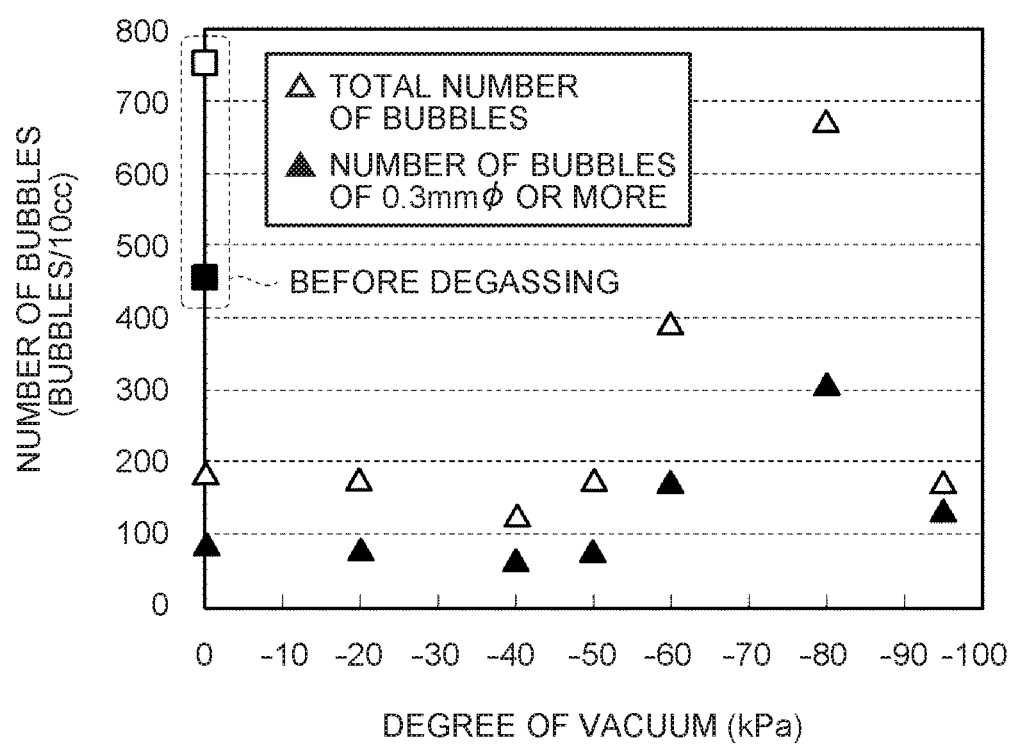
FIG. 5 is a graph showing a relation between a degree of vacuum of the container 110 and the number of bubbles (total number of bubbles and the number of bubbles of ϕ0.3 mm or more) in each paste after degassing.
Figure 6:
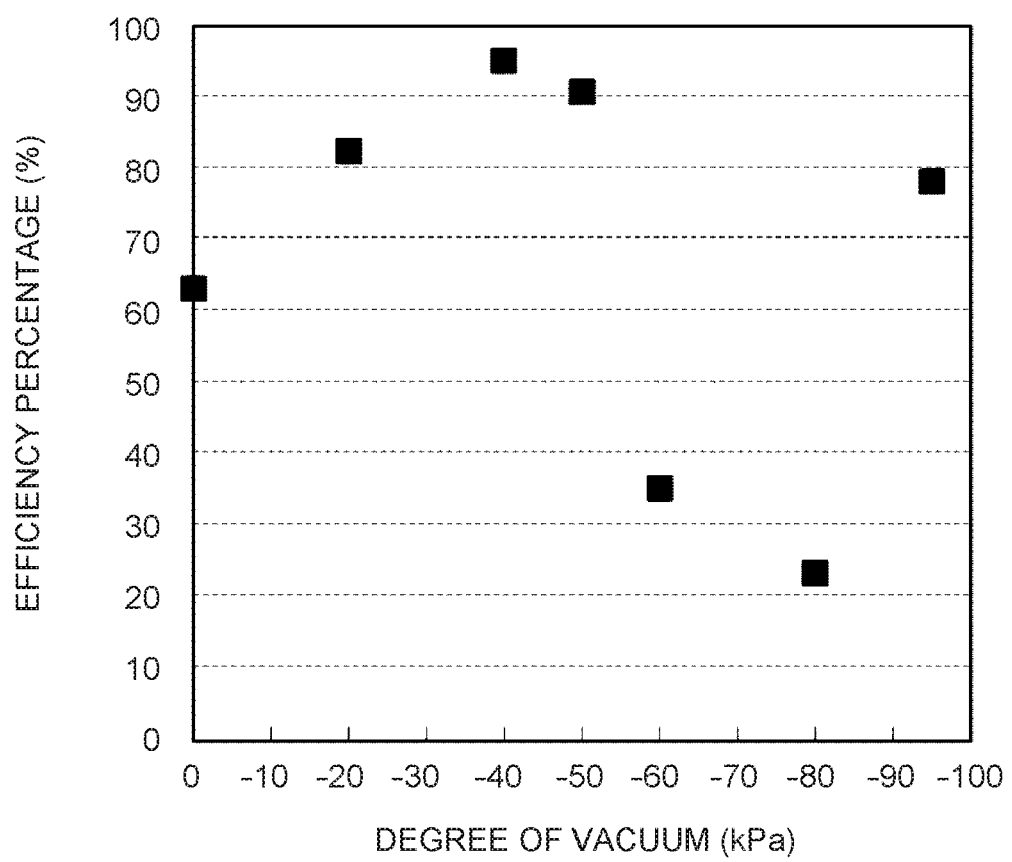
FIG. 6 is a graph showing a relation between the degree of vacuum of the container 110 and an efficiency percentage after an application process of the container 110.

Hereinafter, experiment results will be explained. FIG. 5 is a graph showing a relation between the degree of vacuum of the container 110 and the number of bubbles in each paste after the degassing (the total number of bubbles and the number of bubbles having a diameter of 0.3 mm or more). The horizontal axis represents the degree of vacuum, and the vertical axis represents the number of bubbles in each paste per 10 cc. For reference, the number of bubbles before the degassing is also shown in FIG. 5. A white square mark indicates the total number of bubbles, and a black square mark indicates the number of bubbles having a diameter of 0.3 mm or more. FIG. 6 is a graph showing a relation between each degree of vacuum of the container 110 and the efficiency percentage after the application process. The horizontal axis represents the degree of vacuum, and the vertical axis represents the efficiency percentage (%). In each of FIG. 5 and FIG. 6, in the horizontal axis, the degree of vacuum becomes higher (pressure becomes smaller) in the right direction.

As shown in FIG. 5, by setting the pressure of the container 110 to be −50 kPa or more, the total number of bubbles and the number of bubbles having a diameter of 0.3 mm or more both could be reduced. Hence, as shown in FIG. 6, the case of the container 110 having a pressure of −50 kPa or more exhibited a higher efficiency percentage. In particular, each case of the container 110 having a pressure of −20 kPa to −50 kPa exhibited an efficiency percentage of more than 80%, and each case of the container 110 having a pressure of −40 kPa to −50 kPa exhibited an efficiency percentage of more than 90%. It could be considered that the reason for decrease in number of bubbles as the pressure of the container 110 became lower from 0 kPa to −40 kPa is that bubbles originally present in the paste became expanded to be broken due to the decompression.

To the contrary, if the pressure of the container 110 was set to be further lower than −50 kPa, the number of bubbles started to be increased, and thus the efficiency percentage drastically dropped, as shown in FIG. 6. Specifically, the case of the container 110 having a pressure at −50 kPa exhibited an efficiency percentage of more than 90%, but the case of the container 110 having a pressure at −60 kPa exhibited an efficiency percentage of less than 40%. In the case of the pressure of −60 kPa or more, no striation defects were detected, and only transparency defects due to bubbles affected the efficiency percentage. It could be considered that the reason for increase in number of bubbles as the pressure of the container 110 became lower from −50 kPa to −80 kPa is that gas derived from the solvent (dissolved oxygen) present in the paste newly appeared as bubbles due to the decompression, and the bubbles were not completely eliminated and still remained.

As shown in FIG. 5 and FIG. 6, in the case of the container 110 having a pressure at −80 kPa, the number of bubbles became the maximum, and the efficiency percentage became the minimum. If the pressure of the container 110 was lowered down to −95 kPa, the number of bubbles became decreased, and the efficiency percentage was improved up to nearly 80%. In the case of the container 110 having a pressure at −95 kPa, striation defects due to dry of the paste were detected. Specifically, it was found that both a higher solid content ratio and a higher degree of vacuum newly cause dry of the paste.

As shown in the aforementioned experimental example, at the time of degassing the high-solid-content-ratio electrode paste having a solid content ratio of 55% or more, the degree of vacuum in the container 110 is lowered (pressure is increased) to be −50 kPa or more, which is lower than that of the related art, thereby suppressing the number of bubbles remaining in the electrode paste as well as dry of the electrode paste, thus enhancing the product yield. In the case of the sample having a degree of vacuum of −40 kPa, it was confirmed that bubbles were completely eliminated through filtering.

The present invention is not limited to the aforementioned embodiment and the experimental example, and design changes may appropriately be made without departing from the spirit of the present invention. For example, the present invention is not limited to the nonaqueous electrolyte secondary battery, and may be applicable to production of an electrode paste for any purpose as far as the electrode paste has a solid content ratio of 55 mass % or more. The manner of applying a shear force is not limited to rotation, and for example, the shear force may be applied by thinly spreading the electrode paste by using a spatula.

What is claimed is:

1. A degassing method for an electrode paste comprising:
introducing an electrode paste formed by kneading a solid content that contains an electrode active material and a dispersion medium into a decompressed container and
degassing the electrode paste while a shear force is applied to the electrode paste,
wherein
a ratio of the solid content in the electrode paste is set to be 55 mass % or more, and
a pressure in the decompressed container is set to be from −50 kPa to −20 kPa.

2. The degassing method according to claim 1, wherein the electrode paste is formed into a film form while the shear force is applied to the electrode paste.

3. The degassing method according to claim 1, wherein the electrode paste is fed to a disk-shaped rotor disposed in the decompressed container so as to apply the shear force to the electrode paste.

4. The degassing method according to claim 3, wherein the electrode paste is brought to spatter from the rotor so as to collide against an inner wall surface of the decompressed container.

5. The degassing method according to claim 1, wherein the electrode paste discharged from the decompressed container is filtered through a filter.

6. The degassing method according to claim 1, wherein the electrode paste is for an electrode of a nonaqueous electrolyte battery.

* * * * *